(12) United States Patent
Zhu

(10) Patent No.: US 7,926,714 B1
(45) Date of Patent: *Apr. 19, 2011

(54) CONTEXT-BASED CARD SELECTION DEVICE

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,372

(22) Filed: Dec. 4, 2009

Related U.S. Application Data

(63) Continuation of application No. 12/172,813, filed on Jul. 14, 2008, now Pat. No. 7,644,859, which is a continuation of application No. 10/901,630, filed on Jul. 28, 2004, now Pat. No. 7,413,113.

(51) Int. Cl.
*G06K 5/00* (2006.01)
(52) U.S. Cl. .................. 235/380; 235/375; 235/379
(58) Field of Classification Search .................. 235/375, 235/379, 380
See application file for complete search history.

(56) References Cited

U.S. PATENT DOCUMENTS

| | | | |
|---|---|---|---|
| 6,314,409 B2 | 11/2001 | Schneck et al. | |
| 6,490,601 B1 | 12/2002 | Markus et al. | |
| 6,886,741 B1 | 5/2005 | Salveson | |
| 7,146,159 B1 | 12/2006 | Zhu | |
| 7,413,113 B1 | 8/2008 | Zhu | |
| 7,644,859 B1 * | 1/2010 | Zhu | 235/380 |
| 2004/0218741 A1 | 11/2004 | Welton | |
| 2004/0260647 A1 | 12/2004 | Blinn et al. | |

OTHER PUBLICATIONS

Office Action dated Oct. 12, 2006; U.S. Appl. No. 10/901,630, filed Jul. 28, 2007.
Office Action dated Apr. 5, 2007; U.S. Appl. No. 10/901,630, filed Jul. 28, 2007.
Office Action dated Oct. 9, 2007; U.S. Appl. No. 10/901,630, filed Jul. 28, 2007.
Notice of Allowance dated Apr. 8, 2008; U.S. Appl. No. 10/901,630, filed Jul. 28, 2007.
Office Action dated Apr. 16, 2009; U.S. Appl. No. 12/172,813, filed Jul. 14, 2008.
Notice of Allowance dated Sep. 9, 2009; U.S. Appl. No. 12/172,813, filed Jul. 14, 2008.

* cited by examiner

*Primary Examiner* — Karl D. Frech

(57) ABSTRACT

A card transaction device is provided for selecting virtual cards for transactions based on a context. The portable device includes a plurality of virtual cards, and a storage device for storing the plurality of virtual cards. The cards may relate to credit or debit cards, loyalty cards, reward cards, security or access cards, or identification cards, for example. The portable device includes a user interface for a user to maintain rules for selection of one or more virtual cards based on the context of the transaction. The portable device also includes a processor to process the rules and select at least one of the virtual cards based on the context of the transaction.

20 Claims, 2 Drawing Sheets

CONTEXT-BASED CARD SELECTION DEVICE

CROSS-REFERENCE TO RELATED APPLICATIONS

This application is a continuation of and claims priority to U.S. patent application Ser. No. 12/172,813, entitled "Context-Based Card Selection Device", filed on Jul. 14, 2008, which is a continuation of U.S. Pat. No. 7,413,113, entitled "Context-Based Card Selection Device", issued on Aug. 19, 2008; and contains subject matter similar to U.S. Pat. No. 7,146,159, entitled "Over-the-Air Card Provisioning System and Method", issued on Dec. 5, 2006, all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the consolidation of multiple card transaction devices into a single device. More particularly, embodiments of the present invention provide for rules that specify which of a plurality of surrogates for card transaction devices are to be used based on the context of their use.

BACKGROUND OF THE INVENTION

Data can be stored in various types of cards and other portable items that can be referred to generically as card transaction devices. One category of card transaction device can include payment cards such as credit cards, debit cards, gift cards, and cards for various prepaid services or goods. Data is typically stored on such cards in a magnetic strip. Another category of card transaction device can be referred to as "smart cards". These cards contain data processing circuitry that offers more computing capacity than magnetic strip cards.

In addition to account and payment information, data that might be stored on card transaction devices can include information related to loyalty reward programs such as those operated by airlines, grocery stores, and other retail merchants. Electronic coupons, electronic tickets, personal identification information, medical information, passwords, and other types of information can also be stored on card transaction devices.

Another category of card transaction device includes cards known as radio frequency identification, or RFID, cards. RFID cards can uniquely identify a person or object associated with the card and are therefore sometimes used as keys to allow access to restricted areas. For example, a reading device capable of reading data embedded in an RFID card can be placed near an entrance to a restricted area. When an RFID card is brought into the proximity of the card reader, a radio frequency signal is exchanged between the card and the reader. If the identifying information in the card indicates that a person associated with the card is allowed access to the area, the reader can cause access to be granted.

RFID cards can also be used to make automatic payments of, for example, highway tolls. An RFID card in an automobile can be read by a card reader at a toll booth. As the automobile passes through the toll booth, the card reader can cause a toll to be automatically deducted from a prepaid account or credited to a credit card.

Any device that can be used for this purpose or that functions in the manner of the RFID cards described above will be referred to herein as a traditional RFID card. It should be understood that traditional RFID cards and other card transaction devices mentioned herein can have shapes and sizes other than a wallet-sized card. The term "card reader" refers to a device that can send information to and receive information from a traditional RFID card or other card transaction device and take an action in response to the received information.

SUMMARY OF THE INVENTION

An embodiment of the invention is card transaction device for selecting virtual cards for transactions based on a context. The portable device includes a plurality of virtual cards, and a storage device for storing the plurality of virtual cards. The cards may relate to credit or debit cards, loyalty cards, reward cards, security or access cards, or identification cards, for example. The portable device includes a user interface for a user to maintain rules for selection of one or more virtual cards based on the context of the transaction. The portable device also includes a processor to process the rules and select at least one of the virtual cards based on the context of the transaction.

An alternative embodiment is a method for selecting a card from among a plurality of virtual cards based on a context. The method includes communicating between a mobile device and a card reader. The mobile device maintains a plurality of virtual cards. The method includes receiving, by the mobile device, information regarding a context. The information also includes processing a set of rules to select one or more of the plurality of virtual cards based on the context.

In one embodiment, the present disclosure provides a system for selecting a virtual card appropriate for a context. The system includes a plurality of virtual cards and a set of rules related to one or more of the plurality of virtual cards. The set of rules has a context component. The system also includes a processor to apply at least one of the set of rules and select one or more of the plurality of virtual cards based on the context component.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
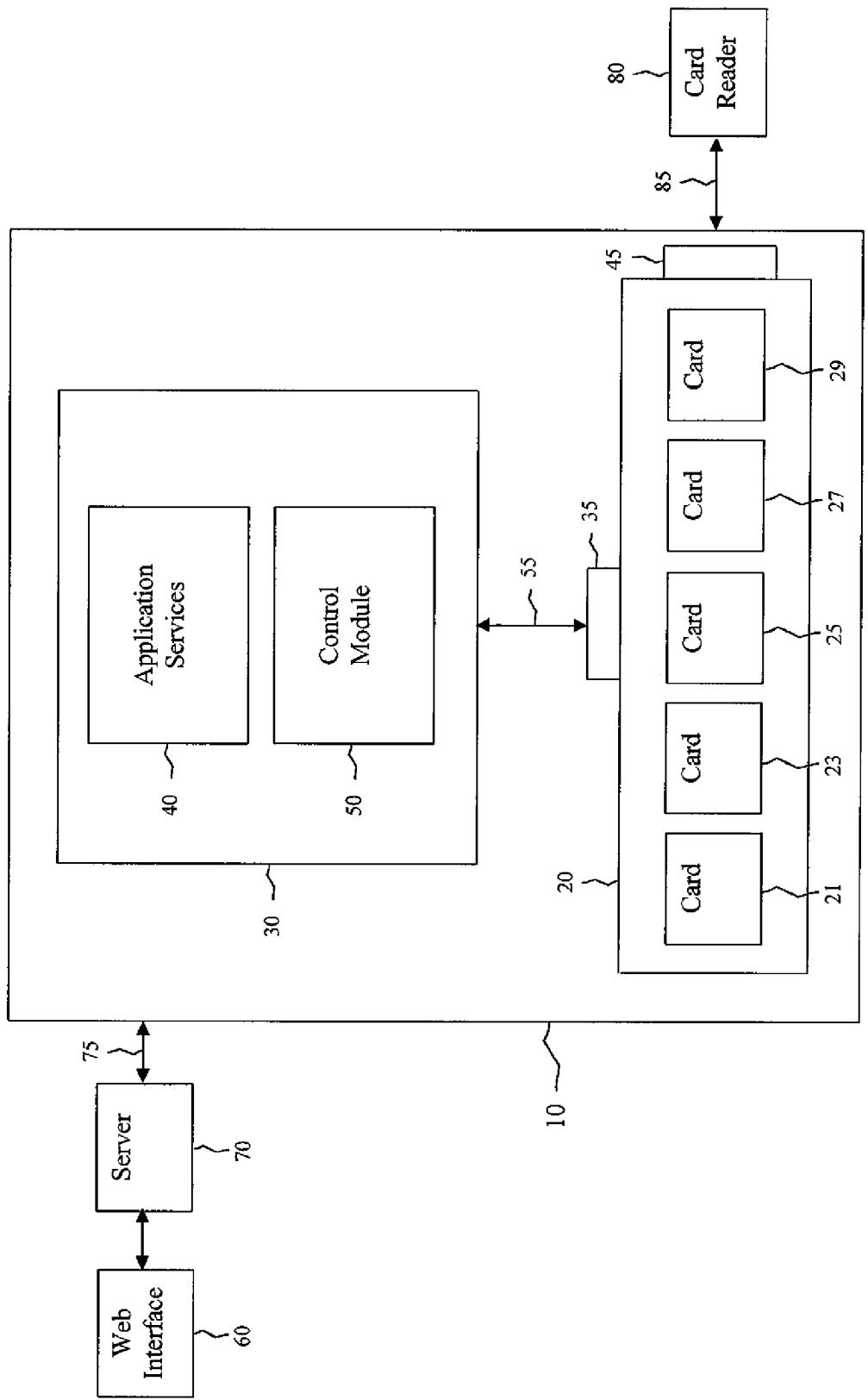
FIG. 1 is a block diagram of a context-based card selection system, according to one embodiment of the present disclosure.

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present invention allow the information stored in multiple card transaction devices to be combined in a single mobile device. In one embodiment, the device is physically integrated with a mobile telecommunications device such as a mobile telephone handset. In another embodiment, the device is a stand-alone unit that is not physically associated with any other device.

In some embodiments the card transaction device includes one or more virtual cards and a physical device. The virtual card includes account information and/or data to enable the transaction capabilities and function of the card, such as, but not limited to, credit cards, loyalty or coupon cards, identification cards, security cards, debit or smart cards, or other transaction type cards. The account information and/or data may include, for example, the virtual card holder's information, information about the virtual card, such as account number, issuer information, and any other information relevant or necessary for transactions. The card transaction device includes a portable device whereon the virtual cards may be stored, deployed, used, or enabled. The portable device may be, for example, a wireless or mobile telephone, a handheld device, such as a PDA or other portable device, combination device, laptop or other portable computers, a smart card, memory stick or card, or any other device operable for storing the virtual card. The portable device may include a transaction component for communication with vendor devices, for example, by wireless, such as infrared, optic or radio communication, wired, magnetic, or other known or hereafter developed technologies for communication between the portable device and, for example, point of sale, security, or any other vendor transaction devices. The security for the virtual card may be enabled by hardware or software components on the portable device, as part of the virtual card, or combinations of both.

In an embodiment, the portable device contains software and/or electronic circuitry that can perform at least a portion of the data storage and data processing functions typically performed by card transaction devices. At least a portion of this software and/or circuitry that performs at least a portion of the functions of a card transaction device may be referred to herein as a card or virtual card. Hardware may be present within the portable device that can perform data transmission and reception functions for communication with a card reader. The portable device or device may also be able to communicate with an external computer that can perform data storage and processing functions.

Information that is traditionally stored on magnetic strip cards, smart cards, and traditional RFID cards can be stored in the cards integrated within the device. Thus, a plurality of virtual cards may be contained in the portable device and can store a wide variety of data and perform a wide variety of functions that would typically be stored in or performed by numerous disparate card transaction devices. Each virtual card acts as a surrogate for a payment card, smart card, RFID card, or other card transaction device.

If card readers are present at locations where commercial transactions occur or where traditional RFID cards are used, the virtual cards can make payments, provide access to restricted areas, and perform other functions or transactions typically performed by card transaction devices. Communication between a device and various types of card readers can occur via a radio frequency signal, optical signal, wireless internet connection, or other communication method well known in the art.

The device can choose the appropriate virtual card to be employed in a particular situation based on the context of the situation, where the context is a set of interrelated conditions or circumstances that might apply to the situation. For a commercial transaction, the context can include, but is not limited to, the store in which the transaction occurs, the item to be purchased, the amount of the purchase, the balance on the payment card to be used for the purchase, the credit limit on the payment card to be used for the purchase, electronic coupons that may be applicable to the purchase, reward programs that may be applicable to the purchase, the virtual cards that are accepted at the place of purchase, and the most recently used virtual card.

It can be seen that, for commercial transactions, context can include information that might be provided by the establishment at which a transaction occurs, information that might typically be embedded on a payment card, information that might be maintained by an institution that issues payment cards, information on card transaction devices other than a payment card, and previous transaction information that might be stored in the device itself. As used herein, the term "context" can refer to information received from any one of these sources, any combination of these sources, or other sources.

When a purchase is to be made, the card transaction device or device might be brought into proximity with a card reader at the place of purchase. The device might recognize that a purchase is being made and, based on the context, might automatically choose an appropriate virtual card to be used for payment for the purchase. Alternatively, based on the context, the device might present the user of the device with a list of virtual cards from which the user can choose a virtual card to be used for the purchase. The virtual card chosen by the device or the list of virtual cards presented by the device can be determined by a set of context-based rules as described below. When a virtual card is chosen, the device can direct that virtual card to send the appropriate purchasing information to the card reader.

The virtual cards within the device can also perform functions typically performed by traditional RFID cards such as automatic payment of tolls and providing access to restricted areas. When a user of the device approaches a reader of such traditional RFID cards, the appropriate virtual card for the card reader can be selected based on context information received from the card reader. In this case, the context information might be a signal emitted from the reader that can activate certain traditional RFID cards. In one embodiment, the appropriate virtual card automatically responds to the signal sent by the reader without the need for context-based rules.

Alternatively, context-based rules can automatically select the virtual card that will send the appropriate response to the reader based on the signal received from the reader. In yet other alternatives, the user can manually select the appropriate virtual card from a list presented by the device or the device can automatically select the appropriate virtual card based on the device's physical location as determined by, for example, a Global Positioning System associated with the device.

The virtual cards within the device can also store passwords, such as computer login passwords. In an embodiment, a card reader can be present near a computer. When the device is brought into the proximity of the reader, an appropriate password can automatically be sent from the device to the reader based on context information received from the reader. The device might request that the user confirm transmission of the password. In other embodiments, upon reaching a login screen, a user can request that an appropriate password be sent to a reader or can manually select a virtual card that will send an appropriate password to a reader.

The choices made by a user when selecting a virtual card from a list of virtual cards can be used to update the context-based rules. That is, the device can record the user's choices and create or modify rules based on those choices. For example, if the user tends to select a particular virtual card in a particular context, a rule can be created specifying that, in similar contexts in the future, that particular virtual card will be automatically selected or that virtual card will be displayed to the user as the preferred virtual card.

The following examples illustrate ways in which context-based rules can specify the virtual card or cards that might be used in various situations. In one example, a consumer might use a device containing multiple virtual cards to make a purchase at a retail establishment. To do so, the consumer might bring the device into the proximity of a card reader in the establishment. The device would then recognize, from information received from the reader, that the consumer is attempting to make a purchase and would consult the context-based rules to determine which virtual card or cards are appropriate for the purchase.

A rule might first specify the category of payment card, such as credit card or debit card, to be used for the purchase. If, for example, a credit card is to be used, another rule might determine which of several virtual credit cards is to be used. That is, a choice might be made between a virtual credit card issued by the store where the purchase is being made and one of several virtual credit cards issued by financial institutions.

One rule for determining which virtual card is to be used might specify that a certain virtual card is always to be used at a particular store. The identity of a commercial establishment at which a transaction is being made can be determined by information received from a card reader at the establishment. Alternatively, a Global Positioning System or similar satellite-based positioning system can be used to determine the location, and hence the identity, of the establishment.

Another rule might state that a certain virtual card is always to be used for purchasing certain items or certain types of items. Yet another rule might relate the virtual card to be used to the amount of the purchase. That is, if the purchase price is below a specified level, one card is to be used and if the purchase price is above a specified level, another card is to be used. Similarly, the balance or the credit limit on a credit card could determine which virtual card is used. That is, if the balance or credit limit is below a specified level, one card is to be used and if the balance or credit limit is above a specified level, another card is to be used.

Another rule might recognize that only certain payment cards are accepted at a store where a purchase is being made. The device might then present the purchaser with a list of acceptable cards. Other rules might specify that a default virtual card is to be used unless the user selects a different virtual card or that the most recently used virtual card is to be used for all transactions until the card holder changes the rule.

Other rules might deal with electronic coupons and loyalty reward programs. If a particular electronic coupon can be used at a particular store only with a particular card, a rule might state that, if a card holder has the electronic coupon in question and is making a purchase at the store in question, then the virtual card associated with the electronic coupon will be used. Similarly, if reward points can be earned only for purchases made with a particular card, a rule might state that the point-earning virtual card should be used. The rules could use software-based formulas to determine the card that will earn the most points and/or will make the best use of a coupon. Also, the rules might alert the user when sufficient points have been accumulated to make a purchase and might offer the user the option of using points rather than a virtual credit card or other virtual payment card for a purchase.

One of skill in the art will recognize that numerous other context-based rules are possible. In addition multiple rules can be combined into more complex rules that depend on a multi-step logical process to determine the payment cards, electronic coupons, reward programs, and other options that are most appropriate for a context. For purposes of brevity of this disclosure, the vast number of context-based rules and combinations of rules that may be employed will not be discussed herein, but will readily suggest themselves to one skilled in the art.

An additional set of rules might deal with the selection of virtual cards for functions such as automatic toll payment and entry to restricted areas. Card readers associated with functions such as these typically emit signals that activate traditional RFID cards. When multiple cards acting as surrogates for traditional RFID cards are present in a device, the rules can automatically choose the appropriate virtual card based on these signals. Alternatively, a satellite-based positioning system might be used to determine the physical location of a card reader and the rules can automatically choose the appropriate virtual card based on the reader's location. In another alternative, a user might manually select a virtual card to be used as a surrogate for a traditional RFID card.

The rules that specify which virtual card is to be used in which context can be created or modified in several ways. A user might manually select the rules he wishes to use from a set of predefined rules or a menu of rule options. Manual rule creation might be done on the device itself or on a server computer with which the device can communicate. In addition, the device might automatically learn rules regarding the appropriate virtual card to use based on the user's previous virtual card selections in various contexts. The processing capacity to perform this automatic learning might reside in the device itself or on a server computer with which the device can communicate.

Since mobile devices containing multiple virtual cards might have only a limited computing capacity, rule creation, either manual or automatic, might typically be performed on a server computer. After creation, the rules could be stored on the server and retrieved by the device as necessary. In the case where the device is integrated with a mobile telephone handset, communication of rules between the server and the device could occur via standard mobile communications protocols, such as CDMA. Alternatively, a wireless internet connection or other means of wireless communication could be employed. In another alternative, the rules could be created, either manually or automatically, on the server and then sent, via wireless communication, to the device, where they could be stored.

FIG. 1 illustrates an embodiment of a system for context-based card selection. A device 10 contains a microprocessor chip 20 and an application layer 30. The microprocessor chip 20 contains a plurality of virtual cards 21, 23, 25, 27, and 29. While five virtual cards are shown in FIG. 1, other numbers could be present. The chip 20 has a dual-interface: a contact interface 35 for internal communications within the device 10 and an external interface 45 for communication with card readers which may be a contact or contactless interface. The chip 20 uses the contact interface 35 to communicate with the application layer 30 via path 55 and uses the external interface 45 to communicate with a card reader 80 via path 85. Communication path 85 can be a radio frequency signal, optical signal, wireless internet connection, or other communication method well known in the art and external interface 45 is capable of communicating by one or more of these methods.

The application layer 30 consists of an application services module 40 and a control module 50. The application services module 40 contains or has access to a set of context-based rules. The control module 50 processes the rules and context information to determine one or more virtual cards 21, 23, 25, 27, or 29 appropriate for a context.

A web interface 60 can be used to interact with a server 70, which can communicate with the application layer 30 via path 75. Path 75 can be a standard wireless telephony protocol (such as CDMA), a wireless internet connection, or some other means of wireless communication.

In an example of a consumer using a device 10 to make a purchase at a commercial establishment, the device 10 is brought into the proximity of a card reader 80 within the establishment. Context information is then sent via path 85 from the card reader 80 to the external interface 45 within the device 10. The external interface 45 passes the information to the microprocessor chip 20, which recognizes that a virtual card 21, 23, 25, 27, or 29 with which to make the purchase needs to be selected. The chip 20 sends a signal via path 55 to the control module 50 that a virtual card 21, 23, 25, 27, or 29 needs to be selected.

The control module 50 consults the application services module 40 for context-based rules related to the context information received from the card reader 80. The application services module 40 retrieves the rules either internally or from the server 70 and returns the rules to the control module 50. Using the rules and the context-based information, the control module 50 determines a category of card to use for the purchase and then determines the specific virtual card 21, 23, 25, 27, or 29 within the category. The control module 50 signals the chip 20 to activate the appropriate virtual card 21, 23, 25, 27, or 29 to send payment information to the card reader 80.

If there is not enough context information to select a virtual card 21, 23, 25, 27, or 29, an interface on the device 10 can offer the consumer a list of appropriate virtual cards. When the consumer manually selects a virtual card 21, 23, 25, 27, or 29 from this list, that card sends payment information, via external interface 45 and communication path 85, to the card reader 80. The control module 50 can remember the consumer's choice and use the choice to refine the context-based rules. That is, in a similar context in the future, the control module 50 might automatically select the same virtual card that the consumer chose manually or might offer that virtual card to the consumer as the preferred card for the context.

In an example of the device 10 being used in the manner of traditional RFID cards, the device 10 is brought into the proximity of a card reader 80. The card reader 80 emits a radio frequency signal 85 that is received by external interface 45 and passed on to the chip 20. The chip 20 consults the application layer 30 in the manner described above to determine an appropriate virtual card 21, 23, 25, 27, or 29 for the card reader 80. That virtual card is then activated and sends information to the card reader 80. The card reader 80 then processes the information appropriately, for example by opening a gate or by deducting a toll from an account.

The web interface 60 can be used to create or modify context-based rules. Rule-related information can be entered through the web interface 60 and stored on the server 70. The rules can then be retrieved from the server 70 as needed by the application services module 40. Alternatively, the rules can be transferred from the server 70 to the application services module 40 and stored there. Faster response might be achieved if the rules reside in the application services module 40 rather than the server 70 but the device 10 might require a greater computing capacity in that case. In another alternative, the context-based rules are created or modified directly through an interface on the device 10 and the web interface 60 and the server 70 are not needed.

Figure 2:
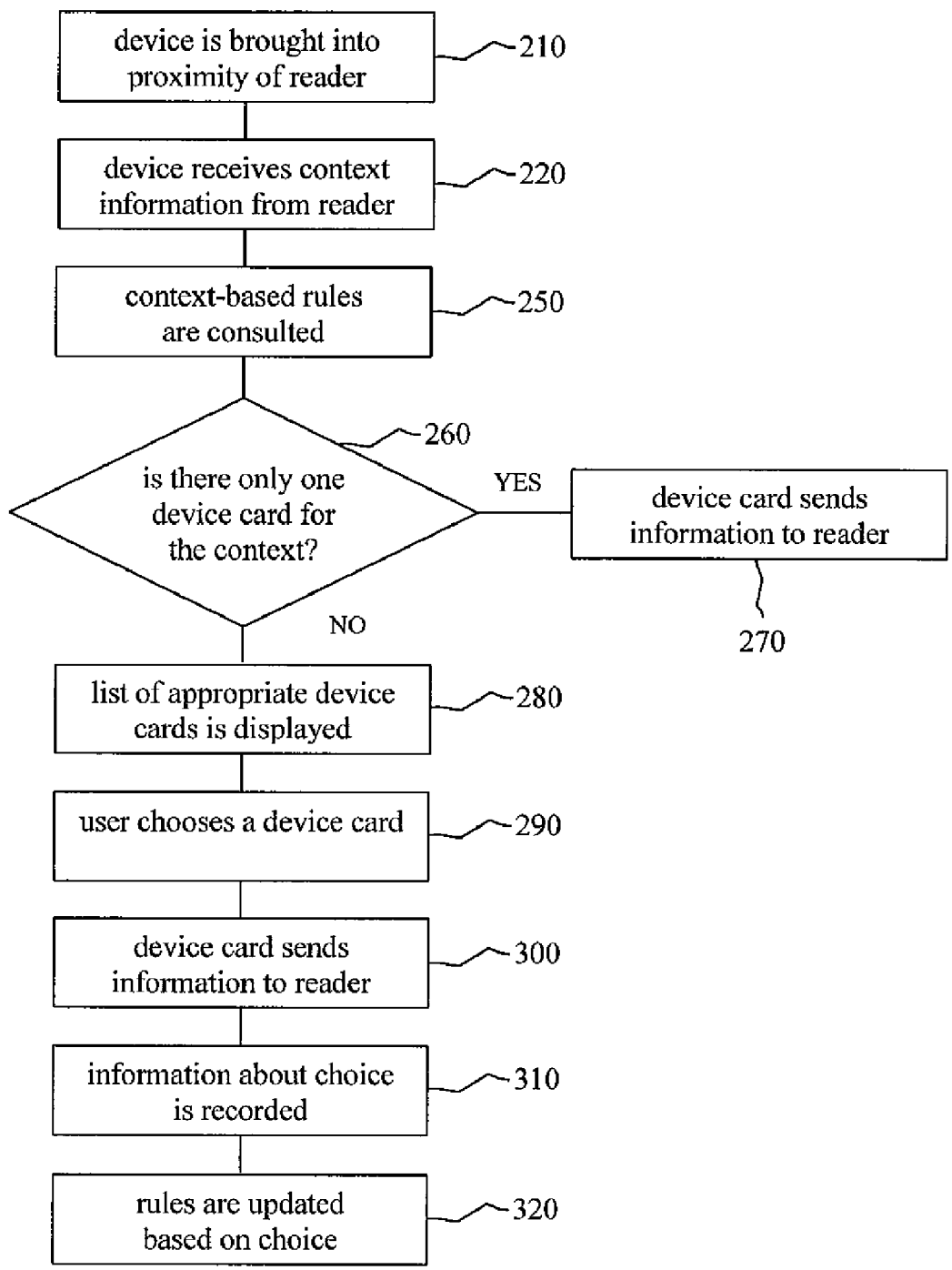
FIG. 2 is a flowchart of a method for context-based card selection, according to another embodiment of the present invention.

FIG. 2 is a flowchart illustrating an embodiment of a method for selecting a virtual card based on context. In box 210, a device containing several virtual cards is brought into the proximity of a card reader. In box 220, the device receives context information from the card reader. In other embodiments, context information might be inferred from the physical location of the device as determined by a Global Positioning System associated with the device. A set of context-based rules is consulted in box 250 to determine the appropriate virtual card or cards for the context.

Two options are possible in box 260. In one option, the context-based rules indicate that only one virtual card is appropriate for the context or that one virtual card is more appropriate than the others. In this case, the appropriate virtual card sends the appropriate information to the card reader in box 270. The device might ask a user for confirmation before the virtual card sends its information.

If the context-based rules indicate that more than one virtual card can be used in the context, the device displays a list of appropriate virtual cards in box 280. In box 290, the user selects the virtual card to be used. In box 300, the selected virtual card sends the appropriate information to the card reader. The device records information about the choice made by the user in box 310. In box 320, the context-based rules are updated based on the user's choice so that, in the future, a similar choice might be made automatically in a similar context.

While several embodiments have been provided in the present disclosure, it should be understood that the Context-Based Device Card Selection may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alter-

What is claimed is:

1. A method for selecting one or more virtual cards appropriate for a transaction based on a context of the transaction, comprising:
   storing a plurality of virtual cards on a mobile device;
   receiving, by the mobile device, context information of the context of the transaction; and
   automatically selecting, by the mobile device, one or more of the plurality of virtual cards appropriate for the transaction based on processing context-based rules in accordance with the context of the transaction including the received context information,
   wherein the context-based rules includes at least one rule created or modified based on previous selections of virtual cards.

2. The method for selecting one or more virtual cards according to claim 1, wherein the mobile device automatically selects more than one of the plurality of virtual cards appropriate for the transaction based on the received context information.

3. The method for selecting one or more virtual cards according to claim 2, further comprising:
   receiving a user selection, by the mobile device, of one of the more than one of the plurality of virtual cards;
   creating a context-based rule or modifying one of the context-based rules based on the user selection.

4. The method for selecting one or more virtual cards according to claim 3, wherein creating the context-based rule or modifying one of the context-based rules is performed by the mobile device or a server in communication with the mobile device.

5. The method for selecting one or more virtual cards according to claim 3, wherein creating the context-based rule or modifying one of the context-based rules based on the user selection establishes a rule specifying that in future contexts similar to the context of the transaction, the user selected one of the more than one of the plurality of virtual cards is automatically selected or is displayed as a preferred virtual card.

6. The method for selecting one or more virtual cards according to claim 1, wherein the at least one rule specifies that a most recently used one of the plurality of virtual cards is to be used until manually changed.

7. A method for selecting one or more virtual cards appropriate for a transaction based on a context of the transaction, comprising:
   storing a plurality of virtual cards on a mobile device;
   receiving, by the mobile device, context information of the context of the transaction; and
   automatically selecting, by the mobile device, one or more of the plurality of virtual cards appropriate for the transaction based on processing context-based rules in accordance with the context of the transaction including the received context information,
   wherein the context-based rules includes at least one rule for selecting one of the plurality of virtual cards based on an attribute of an item involved in the transaction.

8. The method for selecting one or more virtual cards according to claim 7, wherein the transaction is a purchase transaction for purchasing the item and the attribute is one of the item itself, a type of the item, or a cost of the item.

9. The method for selecting one or more virtual cards according to claim 8, wherein the at least one rule establishes to automatically select the one of the plurality of virtual cards for purchases of certain items, certain types of items, or items of a certain cost.

10. The method for selecting one or more virtual cards according to claim 9, wherein the at least one rule establishes that if the cost of the item is below a specified level, a first of the plurality of virtual cards is to be selected, and if the cost of the item is above a specified level, a second of the plurality of virtual cards is to be selected.

11. The method for selecting one or more virtual cards according to claim 7, wherein the transaction is a purchase transaction, the item is a payment card of the plurality of virtual cards, and the attribute is one of a balance or a purchase limit of the payment card.

12. The method for selecting one or more virtual cards according to claim 11, wherein the at least one rule establishes that if the balance or purchase limit of the payment card is below a specified level, the payment card is to be selected, and if the balance or purchase limit of the payment card is above a specified level a second payment card of the plurality of virtual cards is to be selected.

13. The method for selecting one or more virtual cards according to claim 7, wherein the transaction is a purchase transaction, the item is a coupon, and the attribute is that the coupon can be used with a particular payment card of the plurality of virtual cards.

14. The method for selecting one or more virtual cards according to claim 13, wherein the at least one rule establishes that if the coupon can be used in the transaction, the particular payment card is to be selected.

15. The method for selecting one or more virtual cards according to claim 7, wherein the transaction is a purchase transaction, the item is a payment card of the plurality of virtual cards, and the attribute is reward points associated with the payment card.

16. The method for selecting one or more virtual cards according to claim 15, wherein the at least one rule establishes that if reward points can be earned in the transaction, the payment card is to be selected.

17. The method for selecting one or more virtual cards according to claim 15, wherein the at least one rule establishes that if use of the payment card will earn the most reward points in the transaction, the payment card is selected.

18. The method for selecting one or more virtual cards according to claim 15, wherein the at least one rule establishes that if the reward points of the payment card are sufficient to complete the transaction, the payment card is to be selected that the reward points of the payment card are to be used to complete the transaction.

19. A method for selecting a virtual card appropriate for a transaction based on a context of the transaction, comprising:
   storing a plurality of virtual cards on a mobile device;
   receiving, by the mobile device, context information of the context of the transaction; and
   automatically selecting, by the mobile device, one of the plurality of virtual cards appropriate for the transaction based on the received context information, wherein the received context information includes a signal that can activate a traditional radio frequency identification card.

20. The method for selecting one or more virtual cards according to claim 19, wherein the one of the plurality of virtual cards appropriate for the transaction automatically responds to the signal without the need for context-based rules.

* * * * *